Figure 1:
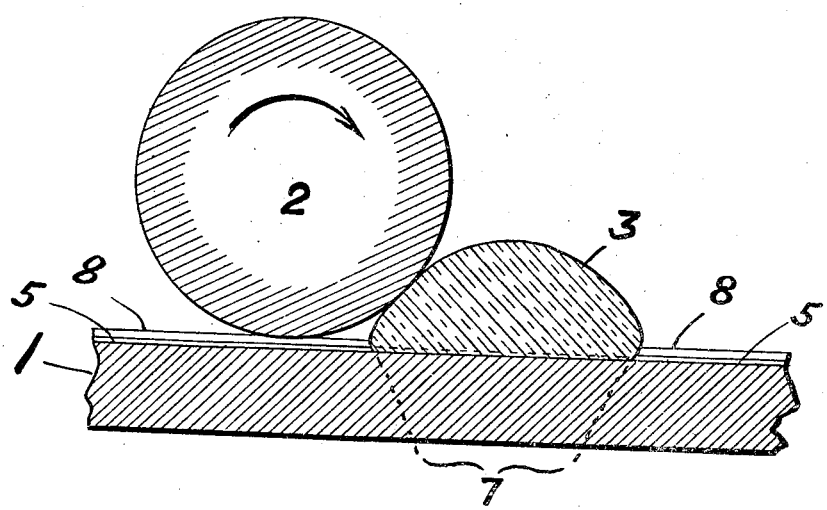

W. COX.
APPARATUS FOR ROLLING RIBBED GLASS.
APPLICATION FILED OCT. 14, 1915.

1,313,071.

Patented Aug. 12, 1919.

WITNESS:

INVENTOR
Walter Cox
BY
Augustus B. Stoughton
ATTORNEY.

UNITED STATES PATENT OFFICE.

WALTER COX, OF PHILADELPHIA, PENNSYLVANIA, ASSIGNOR TO PENNSYLVANIA WIRE GLASS COMPANY, OF PHILADELPHIA, PENNSYLVANIA, A CORPORATION OF NEW JERSEY.

APPARATUS FOR ROLLING RIBBED GLASS.

1,313,071.   Specification of Letters Patent.   Patented Aug. 12, 1919.

Application filed October 14, 1915. Serial No. 55,824.

*To all whom it may concern:*

Be it known that I, WALTER COX, a citizen of the United States, residing at Philadelphia, in the county of Philadelphia and State of Pennsylvania, have invented a certain new and useful Apparatus for Rolling Ribbed Glass, of which the following is a specification.

Ribbed glass usually contains about twenty ribs to the inch and, as heretofore made, parts amounting to from ten to twenty per cent. of all sheets of ribbed glass presented a peacock feather appearance so objectionable that those parts of the sheets were cut off in order to make the glass salable, thus the output of salable glass was reduced and time and labor and, in the case of wire glass, wire were wasted.

The principal object of the present invention is to produce glass which shall be ribbed and of the kind known as ribbed glass and which shall be initially free from such defects as have been above referred to, whereby production is increased and economy effected.

The peacock feather appearance which has been referred to as a defect is caused by a difference in the shape of the ribs at different parts of the sheet, and this difference in the shape of the ribs was heretofore unavoidable, although all the grooves in the table were identical in size and shape. The ribs were of different shape in different parts of the sheet because the grooves in the table had narrow angled sides which made the grooves so deep that the portion of the glass of the pour that initially contacted with and was chilled by the table and herein referred to as the "cold spot" could not fill the bottom of the grooves, whereas the rest of the glass, being hotter and more fluid, did so. According to my invention wide angled grooves are employed and their sides are at such an inclination that all of the glass including the "cold spot" reaches and fills the bottoms of the grooves. The angle employed by me for the grooves, in cases where there are about twenty ribs to the inch, is 12½° to the plane of the table. The angle may be decreased but such decrease is limited because it is necessary that ribs be formed, otherwise the product would not be what is known as ribbed glass. The angle may be increased but its increase is limited by the appearance of the "cold spot" defect above referred to. The angle should be between 5° and 40° as limiting figures, but, as I have said, I have produced excellent results by the employment of 12½°.

In the accompanying drawings I have illustrated, somewhat diagrammatically, a table embodying features of the invention adapted for the practice of the process, and in those drawings—

Figure 2:
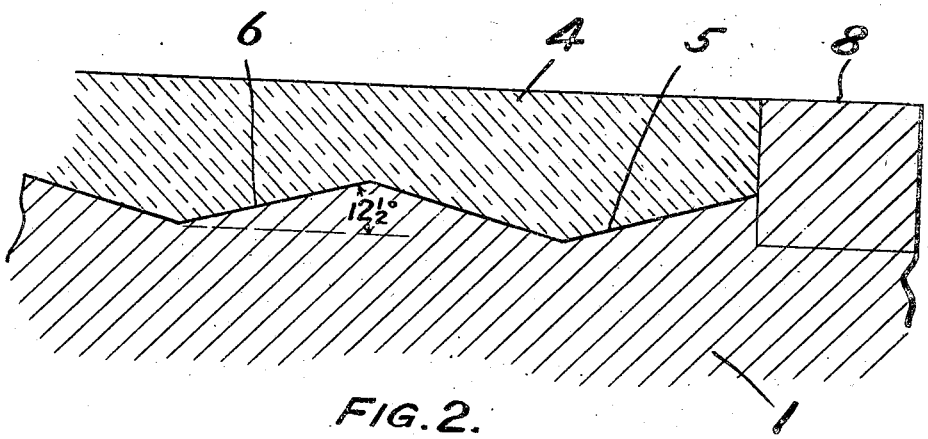

Figure 1, is a sectional view of a portion of a table, its roller and a pour of glass, and Fig. 2, is a sectional view, drawn to a very much enlarged and exaggerated scale, and showing a portion of the table and a portion of a sheet of ribbed glass.

In the drawings 1, is the table, 2, is the roller, 3, is a pour of glass, and 4, is a sheet of ribbed glass. 5, are wide angled grooves cut or formed in the surface of the table, about twenty to the inch, and their side walls 6, are shown at an angle of 12½° to the plane of the table or to the horizontal, it being understood that this angle can be varied as above described. The "cold spot" is indicated at 7, in Fig. 1, and a part of it is shown in Fig. 2, and by reason of the wide angled grooves in the table the glass at the "cold spot" completely fills the bottom of the grooves underlying it just as the rest of the glass completely fills the bottoms of the grooves at other parts of the table when the roller 2, is passed over the table on its trangs 8, so that the sheet of ribbed glass is rolled initially free from "cold spot" defects and the quantity of salable glass produced is therefore greatly increased.

What I claim is:

A table for rolling ribbed glass free from visible cold spot defects having shallow wide angled grooves with flat faced ribs between them cut in the surface of the table, about twenty grooves to the inch, the angle of the flat sides of the ribs between the grooves being from 5° to 40° to the plane of the table.

WALTER COX.